United States Patent [19]

Chang et al.

[11] Patent Number: 5,692,019
[45] Date of Patent: Nov. 25, 1997

[54] COMMUNICATION DEVICE HAVING ANTENNA SWITCH DIVERSITY, AND METHOD THEREFOR

[75] Inventors: Chun-Ye Susan Chang, Boca Raton; Jian-Cheng Huang, Lake Worth; Lu Chang, Boca Raton; Lorenzo Ponce De Leon; David Petreye, both of Lake Worth; James Michael Keba, Wellington; Clinton C. Powell, II, Lake Worth, all of Fla.

[73] Assignee: Motorola, Inc., Schaumburg, Ill.

[21] Appl. No.: 664,747

[22] Filed: Jun. 17, 1996

[51] Int. Cl.$^6$ .................. H04B 7/10; H04L 1/02
[52] U.S. Cl. .............. 375/347; 455/272; 455/277.1; 455/277.2
[58] Field of Search .............. 375/347; 455/272, 455/275, 277.1, 277.2, 134

[56] References Cited

U.S. PATENT DOCUMENTS

| | | | |
|---|---|---|---|
| 4,499,606 | 2/1985 | Rambo . | |
| 4,513,412 | 4/1985 | Coxq . | |
| 4,742,568 | 5/1988 | Furuya . | |
| 4,914,714 | 4/1990 | Tamura . | |
| 4,977,616 | 12/1990 | Linder et al. | 455/277 |
| 5,109,536 | 4/1992 | Kommrusch | 455/82 |
| 5,241,701 | 8/1993 | Andoh | 455/272 |
| 5,329,555 | 7/1994 | Marko et al. | 375/100 |
| 5,369,801 | 11/1994 | Smith | 455/277.1 |
| 5,430,769 | 7/1995 | Patsiokas et al. | 375/347 |
| 5,446,922 | 8/1995 | Siwiak et al. . | |
| 5,481,571 | 1/1996 | Balachandran et al. | 375/347 |
| 5,499,397 | 3/1996 | Wadin et al. | 455/277.1 |
| 5,507,035 | 4/1996 | Bantz et al. | 455/133 |
| 5,530,926 | 6/1996 | Rozanski | 455/277.2 |
| 5,603,107 | 2/1997 | Gottfried et al. | 455/133 |

Primary Examiner—Stephen Chin
Assistant Examiner—Mohammad Ghayour

[57] ABSTRACT

A communication device (400) with a polarization diversity antenna configuration, having a first antenna (410) with a first plane of polarization and a second antenna (412) with a second plane of polarization. Signal strength of a demodulated signal when the antenna switch (420) is coupled to one of the antennas (410, 412) is measured by a signal strength measuring circuit (440) to generate a short-term average signal power (SA) representing signal strength over a first predetermined number of symbol periods, a medium-term average signal power (MA) representing signal strength over a second predetermined number of symbol periods, and a long-term average signal power (LA) representing signal strength over a third predetermined number of symbol periods, greater than the second predetermined number of symbol periods and first predetermined number of symbol periods. Switching between antennas (410, 412) is made in response to differences between SA, MA and LA.

9 Claims, 3 Drawing Sheets

COMMUNICATION DEVICE HAVING ANTENNA SWITCH DIVERSITY, AND METHOD THEREFOR

FIELD OF THE INVENTION

This invention relates to a communication receiver or transceiver suitable for use in a frequency modulation (FM) communication system.

BACKGROUND OF THE INVENTION

In an FM communication system, such as a one-way or two-way messaging system, a phenomena known as "fading" occurs in which a signal is distorted and its strength weakened at a communication receiver, by the topography of a particular geographical location such that the signal received by the communication receiver contains erred information. In most cases, the erred information in the received signal caused by fading can be corrected by using an encoding and error correcting scheme for the information to be transmitted on the radio frequency carrier. For example, interleaving the digital data has proven an acceptable and useful solution. Another solution to fading problems is to provide two antennas spaced apart from each other on the receiver to create spatial diversity.

In a particular type of FM communication, called a simulcast system, there are at least two transmitters that simultaneously transmit a signal to be received by a communication receiver in the coverage area of the two transmitters. Simulcast systems are very useful in one-way and two-way paging or messaging systems, and indeed are unique to paging systems. In such a simulcast system, there are regions of overlap where a communication receiver or transceiver (hereinafter more generally called a "subscriber unit") receives signals transmitted simultaneously from two or more transmitters (called "simulcast paths"). The subscriber unit experiences severe distortion in the received signal when signals from two or more simulcast paths are received with differences in symbol delay, even if the received signal is of an otherwise sufficient. For example, this could occur when the subscriber unit is receiving signals from a relatively distant and a relatively close transmitter, albeit at sufficient power levels. A simulcast error "floor" occurs in a simulcast system when a bit error rate is reached that cannot be reduced and increasing the signal strength (to improve the signal-to-noise ratio) does not reduce the error rate.

Additionally, when a subscriber unit is moving within a simulcast system, the phase difference between simulcast paths fluctuates randomly and bursts of simulcast distortion occur particularly when the phase difference approaches 180 degrees. However, when a subscriber unit is stationary, it may experience a "null" where the distortion is continuously present.

The problems caused by simulcast paths cannot be cured by those techniques used to deal with fading. Creating spatial diversity in the antennas of the communication receiver is applicable primarily in large receiving units, such as automobiles, to cure fading problems, but is not practical in portable communication devices, such as pagers, for example. One known attempt at providing a solution is to induce frequency offsets between simulcast transmitters to artificially "randomize" the phase offsets between simulcast paths affecting stationary subscriber units, causing only occasional bursts of noise. However, even the errors caused by this type of noise sometimes cannot be corrected by conventional coding and interleaving techniques, as is the case for fading. Moreover, a simulcast FM system experiencing Rayleigh fading and additive white Gaussian noise have error "floors" in which case increased signal strength at the subscriber unit does not reduce the error rate in the received information. Indeed, in a simulcast communication system, simulcast paths contribute most to error performance "floors".

It is desirable to reduce error "floors" to solve the overlap problems experienced by a communication device in an FM simulcast communication system. It is also desirable to enable a portable communication receiver to handle signal fading situations independent of encoding and error correction schemes.

DETAILED DESCRIPTION OF THE DRAWINGS

Figure 1:
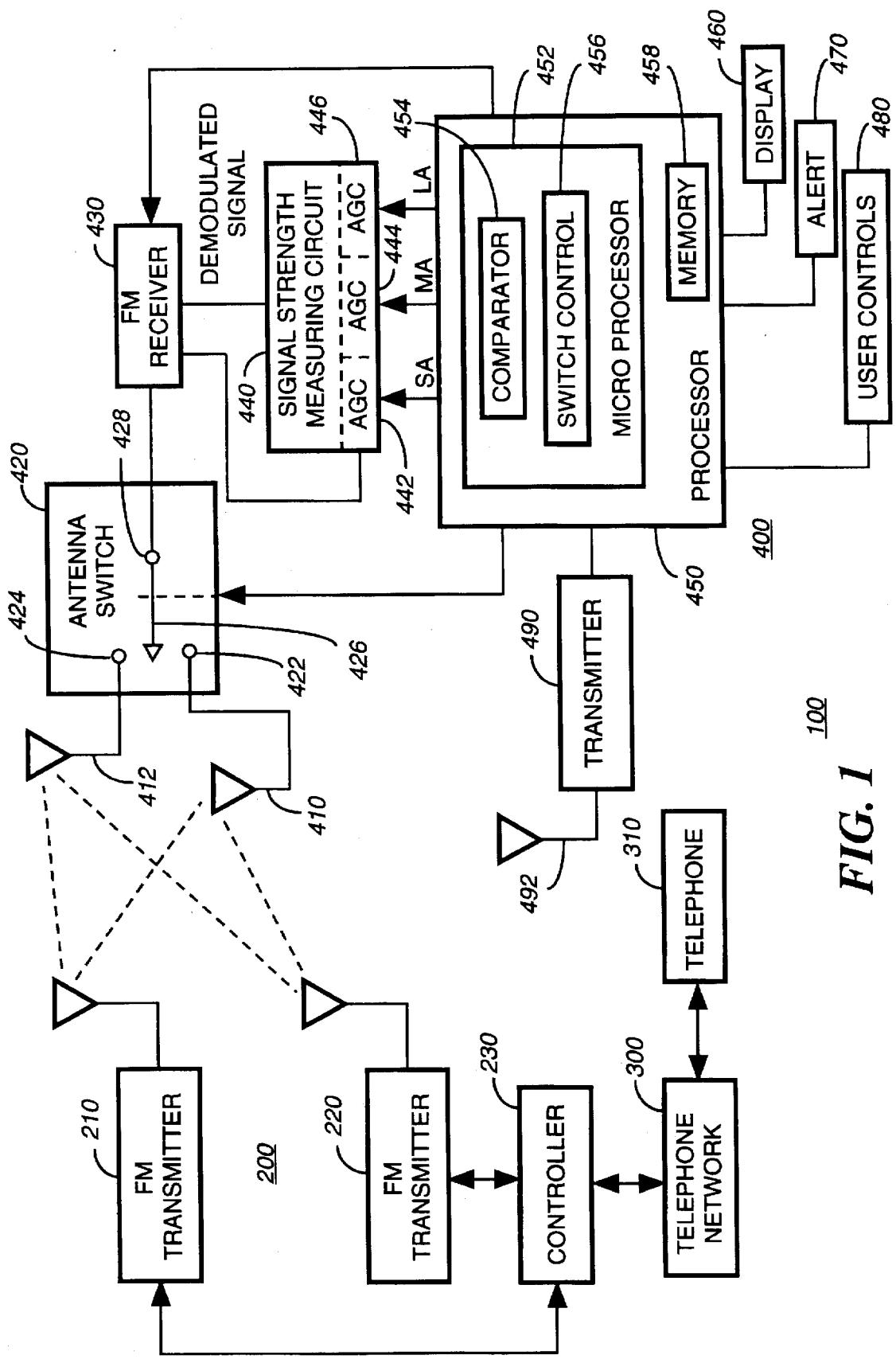
FIG. 1 is a block diagram of a communication system including a subscriber unit according to the present invention.

FIG. 1 shows a communication system 100 comprising a base station 200 coupled to a telephone network 300 to receive message requests from callers at a telephone 310, for transmission to a subscriber unit 400. The base station 200 comprises first and second transmitters 210 and 220 and a controller 230 which controls the first and second transmitters 210 and 220 to transmit simulcast signals. The general layout of the communication system 100 shown in FIG. 1 is one common to messaging (one-way or two-way paging) systems. The subscriber unit 400 is a one-way or two-way communication device, hereinafter also referred to simply as a communication device.

According to the present invention, the subscriber unit 400 features a first antenna 410, a second antenna 412, and an antenna switch 420 coupled to the first and second antennas 410 and 412. An FM receiver circuit 430 is coupled to an output of the antenna switch 420 to demodulate the transmitted simulcast signals received by the first antenna 410 or the second antenna 412, depending on a position of the antenna switch 420. A demodulated signal generated by the FM receiver 430 is coupled to a signal strength measuring circuit 440 to measure several parameters of signal strength of the demodulated signal. The signal strength measuring circuit 440 includes, for example, three automatic gain control (AGC) circuits 442, 444 and 446 that are used to respectively generate quantities representing signal strength over a first predetermined number of symbol periods, such as one symbol period or a few symbol periods, called the short-term average signal power (SA), a medium-term average signal power (MA) representing signal strength over a second predetermined number of symbol periods, and a long-term average signal power (LA) representing signal strength over a third predetermined number of symbol periods. The third predetermined number of symbol periods is greater than the second predetermined number of symbol periods, which is in turn greater than the first predetermined number of symbol periods.

The output of the signal strength measuring circuit 440 is coupled to a processor 450. The processor 450 comprises a microprocessor 452 that includes a comparator portion 454, switch control portion 456, and a memory 458. The processor 450 is the overall control point for the subscriber unit 400 and includes a control program stored in memory 458 to control the FM receiver circuit 430 and other elements in the subscriber unit. The microprocessor 452 executes the control program and also compares the LA, MA and SA quantities, as will be explained in more detail hereinafter, in order to issue a switch control signal that is coupled to the antenna switch 420 to change its position. Alternatively, the comparator portion 454 and switch control portion 456 are embodied by dedicated analog or digital circuits, designated comparator circuit and switch control circuit, respectively, and are separate and apart from the processor 450.

A display unit 460 is coupled to the processor 450 to display message, status and other information to a user of the subscriber unit. Audible alert patterns are also generated by the alert unit 470. User controls 480 are provided to enable the user to read messages, etc. In addition, in the event that the subscriber unit 400 has two-way communication capability, a transmitter 490 is included to transmit response and other message signals via antenna 492. Messages that are received are stored in memory 458. In addition, memory 458 or another memory circuit (not shown) stores an identification code, such as a "subscriber address" that is used to decode messages, data or voice signals addressed to the subscriber unit 400.

Figure 2:
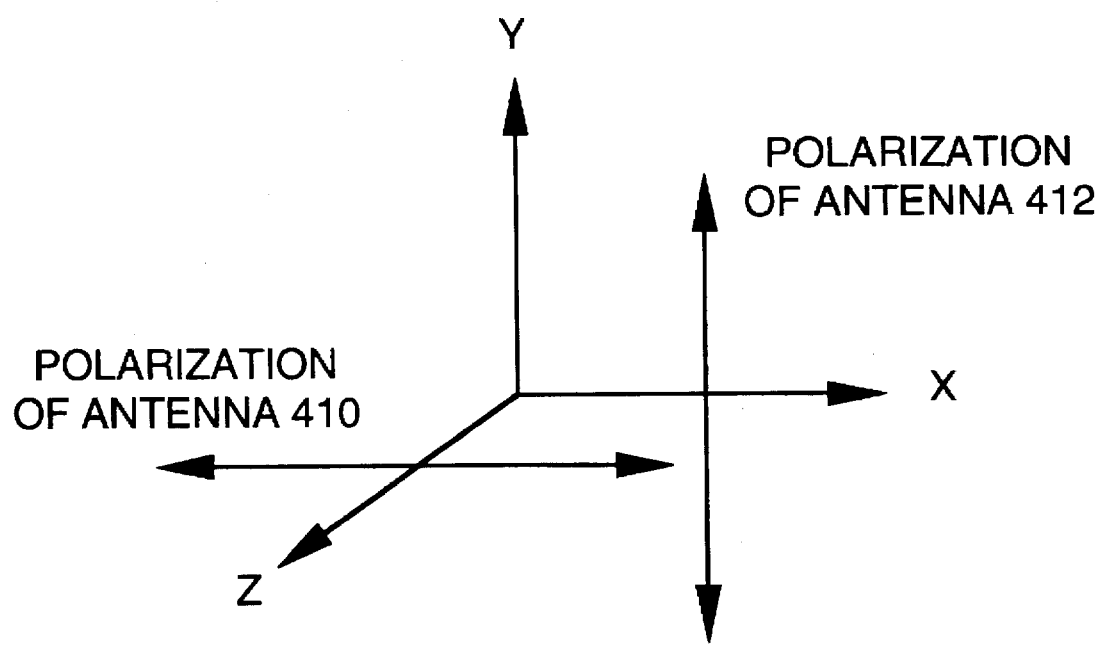
FIG. 2 is a diagram showing the polarization orientation of the antennas of the subscriber unit according to the present invention.

As illustrated in FIG. 2, the first antenna 410 has substantially horizontal polarization and the second antenna 412 has substantially vertical polarization. For example, antenna 410 is horizontally polarized such that polarization of an incident wave in x-z plane results in maximum received signal power at the antenna 410; and antenna 412 is vertically polarized such that polarization of an incident wave in the x-y plane results in maximum received signal power at the antenna 412. Alternatively, antenna 410 is vertically polarized and antenna 412 is horizontally polarized. It should be appreciated that the specific plane of polarization of the antennas is not critical so long as there is a known predetermined angular relationship, not necessarily orthogonal, between a first plane of polarization of one antenna and a second plane of polarization of the other antenna.

Referring again to FIG. 1, the antenna switch 420 comprises two input terminals 422 and 424 that are coupled to the first and second antennas 410 and 412, respectively. A switch arm 426 is movable in response to the switch control signal from the processor 450 to either of the input terminals 422 and 424 in order to couple the transmitted signal received by antenna 410 or antenna 412 to the switch output terminal 428. The antenna switch 420 alternatively is embodied by a "software" switch to make smoother transitions between the antennas 410 and 412.

Figure 3:
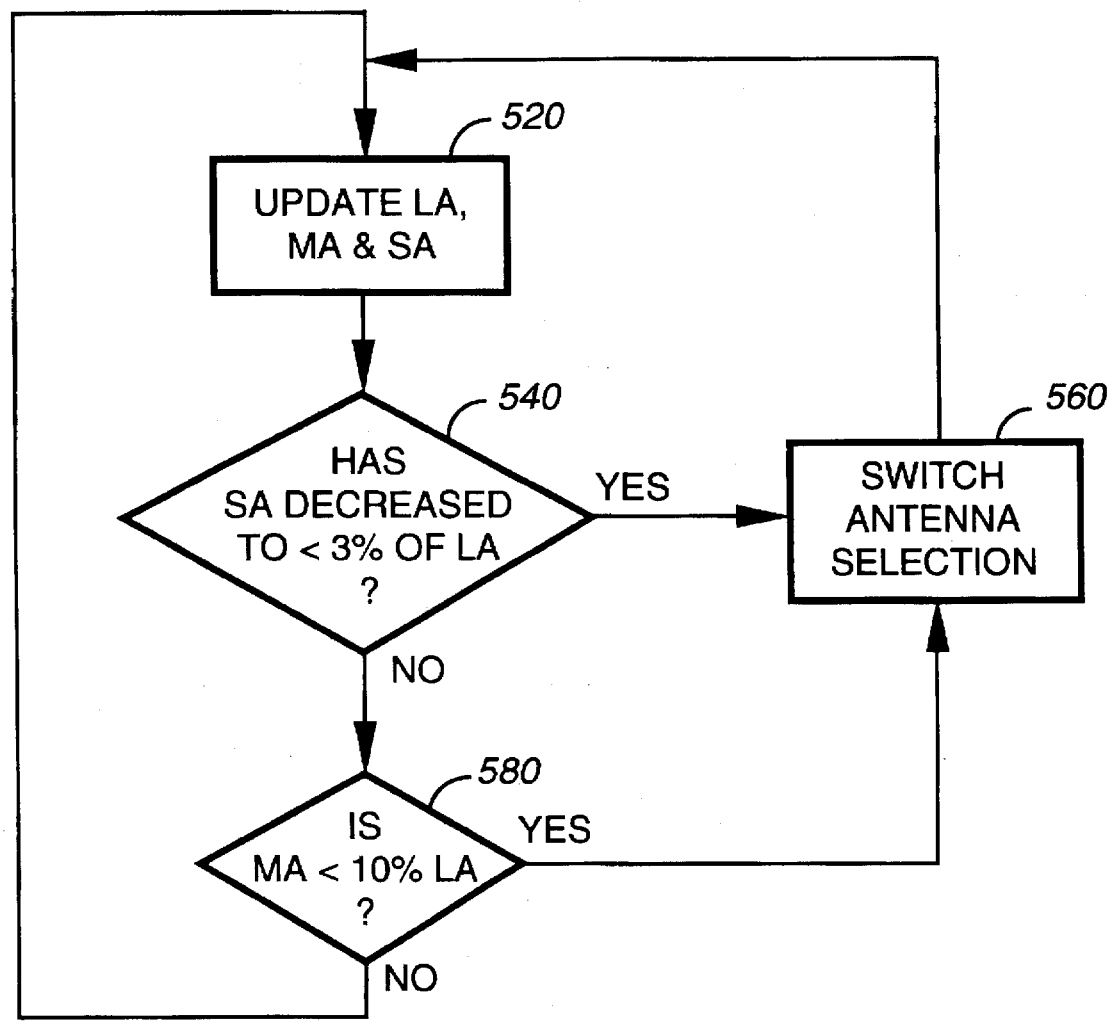
FIG. 3 is a flow chart illustrating a process for controlling the switching between antennas according to the present invention.

Turning now to FIG. 3, the process of switching between the antennas 410 and 412 will be explained in greater detail. Step 520 is performed by the signal strength measuring circuit, in cooperation with the processor 450, and steps 540, 560 and 580 are performed by the processor 450, and in particular the comparator portion 454 and switch control portion 456 of the microprocessor 452. Step 520 depicts a procedure of measuring and updating signal strength of the demodulated signal to generate the long-term average signal power LA, medium-term average signal power MA and the short-term average signal power SA, by the signal strength measuring circuit 440 on the basis of the signal received by the currently selected antenna. The operational flow of FIG. 3 is such that while one of the first antenna and the second antenna is coupled to the receiver circuit, the signal strength of the demodulated signal generated by the receiver circuit is measured and the short-term average signal power, medium-term average signal power, and long-term average signal power are generated. Once a time duration elapses sufficient to determine the long-term average signal power, the short-term average signal power is compared to a first predetermined fraction (3%) of the long-term signal power. In step 540, if SA has decreased below (to a value less than) 3% of LA, then antenna selection is switched from one antenna (the currently selected antenna) to the other antenna in step 560. The procedure then restarts from step 520 to determine SA, MA and LA while the other antenna is coupled to the receiver circuit. Assuming in step 540 that SA has not decreased to less than 3% of LA, then the process continues to step 580 where MA is compared to LA with the other antenna coupled to the receiver circuit. That is, in step 540, a positive decision is made only when SA has decreased from a value that was previously greater than 3% of LA, to a value that is currently (at the time of the comparison), less than 3% of LA. This prevents repeatedly switching between the antennas. A negative decision is made if SA was less than 3% of LA previously, and continues to be at the current comparison.

In step 580, if MA is less than a second predetermined fraction (10%) of LA while the other antenna is coupled to the receiver circuit, and a negative decision is reached in step 540, antenna selection is switched back to the one antenna (previously selected antenna). This process repeats from step 520, and antenna selection is changed between the first and second antennas according to the relative and changing values of SA, MA and LA. Antenna selection is not switched if a negative decision is determined in the comparison step 540, followed by a negative decision in the comparison step 580.

As explained briefly above, SA represents the average signal power of the received signal over a first predetermined number of symbol periods, for example, one digital symbol, or a relatively few number of symbol periods, of the received signal. MA represents the average signal power of the received signal over a second predetermined number of symbols, such as 10 symbols. LA represents the average signal power of the received signal over yet a greater (third predetermined) number of symbols, such as 100 symbols. Thus, in step 520, MA and LA are updated every symbol. The short-term average signal power is determined, at the instant that a comparison is to be made. The three percent (3%) and ten percent (10%) thresholds are variable depending on the particular system and the particular subscriber unit based on factors such as minimum time between antenna switching, minimum acceptable signal strength or power and capture ratio. Step 580 allows for switching back to the previously selected antenna if it is determined that MA is less than a predetermined fraction of LA.

According to the present invention, the switching process is suitable to solve problems caused by simulcast paths deep signal fading that would cause SA to fall or decrease below 3% of LA. Antenna selection is switched to the antenna with the other polarization orientation. After switching, LA, MA and SA are monitored. SA is again compared to LA. If SA does not decrease to less than 3% of LA, then in step 580, MA is compared to LA. If MA is less than 10% of LA, then antenna selection is switched back to the other antenna.

The polarization diversity of at least two antennas together with the specialized control procedure according to the present invention, corrects for poor signal reception caused by fading and/or simulcast paths. Vertically polarized and horizontally polarized antennas have different capture ability of simulcast signals depending on distance and multipath effects. When a selected antenna experiences a power level difference between simulcast signals less than the capture ratio of the receiver, antenna selection is switched to another antenna with a usually larger power level difference between the simulcast signals. The receiver will capture the transmitted signal on a stronger simulcast path if the power level difference is greater than the receiver capture ratio. Consequently, the simulcast problem is overcome once the receiver captures on one simulcast path. The simulcast delays are considered to be the same at the two antennas because of the small space between them on a portable communication device.

It has been found from simulation tests in a communication device, such as a pager or selective call receiver using a zero-intermediate frequency (zero-IF) receiver in a 4-level FM system, that the switch diversity process of the present invention reduces the simulcast error floor and also improves fading performance. In a communication device with a zero-IF receiver, the switch control signal is generated on the basis of the zero-IF signals. For example, with reference to FIG. 1, the antenna switch 420 is coupled "upstream" of the FM receiver 430, and the AGC circuit 442 already present for gain control in the FM receiver 430, detects the level of the received signal coupled at the zero-IF stage. Other signal quality measurements, such as received signal strength indication (RSSI) are useful. Adjacent channel and intermediate modulation interferences are filtered out prior to the zero-IF stage, and thus do not affect the signal levels. This helps prevent false switching decisions. The switching diversity process and apparatus of the present invention is insensitive to a range of antenna correlations and power imbalances, making it well suited for a selective call receiver where size and cost are important constraints.

The advantages of the present invention over other diversity algorithms (such as pure signal strength selection algorithms) include the allowance for switching at a lower threshold, which is tolerant of large power imbalances between signals from the vertically polarized and horizontally polarized antennas.

The present invention is applicable to one-way and two-way communication devices, such as one-way and two-way selective call receivers.

The above description is intended by way of example only and is not intended to limit the present invention in any way except as set forth in the following claims.

What is claimed is:

1. A communication device comprising:
    a first antenna having substantially horizontal polarization for receiving transmitted simulcast signals;
    a second antenna having substantially vertical polarization for receiving transmitted simulcast signals;
    a receiver circuit for demodulating the transmitted simulcast signals received by the first antenna or the second antenna and generating a demodulated signal;
    an antenna switch coupled to the receiver circuit, to the first antenna and to the second antenna, and being responsive to a switch control signal for coupling either the first antenna to the receiver circuit or the second antenna to the receiver circuit;
    a signal strength measuring circuit coupled to the receiver circuit and measuring a signal strength of the demodulated signal and generating as output a short-term average signal power representing signal strength over a first predetermined number of symbol periods, a medium-term average signal power representing signal strength over a second predetermined number of symbol periods, and a long-term average signal power representing signal strength over a third predetermined number of symbol periods, the third predetermined number of symbol periods being greater than the second predetermined number of symbol periods which is greater than the first predetermined number of symbol periods, said signal strength measuring circuit periodically updating the short-term average signal power, the medium-term average signal power and the long-term average signal power; and
    a switch control circuit coupled to the signal strength measuring circuit and the antenna switch, and generating the switch control signal to switch antenna selection from one of the first antenna and the second antenna to an other of the first antenna and the second antenna when the short-term average signal power decreases to less than a first predetermined fraction of the long-term average signal power when said one of the first antenna and the second antenna is coupled to the receiver circuit, and switching antenna selection from said other of the first antenna and the second antenna to said one of the first antenna and the second antenna when the short-term average signal power is greater than the first predetermined fraction of the long-term average signal power and the medium-term average signal power is less than a second predetermined fraction of the long-term average signal power while said other antenna of the first antenna and the second antenna is coupled to the receiver circuit.

2. The communication device of claim 1, wherein the switch control circuit is programmed to compare the short-term average signal power to the first predetermined fraction of the long-term average signal power such that the first predetermined fraction is three percent.

3. The communication device of claim 1, wherein the switch control circuit is programmed to compare the medium-term average signal power to the second predetermined fraction of the long-term average signal power such that the second predetermined fraction is ten percent.

4. A method for receiving a transmitted signal in a communication device having a receiver circuit for generating a demodulated signal, a first antenna having a first plane of polarization and a second antenna having a second plane of polarization, the first plane of polarization having a known predetermined angular relationship with respect to the second plane of polarization, the method comprising steps of:
    measuring a signal strength of the demodulated signal generated by the receiver circuit while one of the first antenna and the second antenna is coupled to the receiver circuit, and generating a short-term average signal power representing signal strength over a first predetermined number of symbol periods, a medium-term average signal power representing signal strength over a second predetermined number of symbol periods, and a long-term average signal power representing signal strength over a third predetermined number of symbol periods, the second predetermined number of symbol periods being greater than the first predetermined number of symbol periods which is greater than the first predetermined number of symbol periods;
    switching antenna selection from said one of the first antenna and the second antenna to an other of the first antenna and the second antenna when the short-term average signal power decreases to less than a first predetermined fraction of the long-term average signal power;

measuring a signal strength of a demodulated signal generated by a receiver circuit while said other of the first antenna and the second antenna is coupled to the receiver circuit, and generating a short-term average signal power, a medium-term average signal power, and a long-term average signal power; and switching antenna selection from said other of the first antenna and the second antenna to said one of the first antenna and the second antenna when the short-term average signal power is greater than the first predetermined fraction of the long-term average signal power and the medium-term average signal power is less than a second predetermined fraction of the long-term average signal power while the second antenna is coupled to the receiver circuit, and otherwise maintaining said one of the first antenna and the second antenna coupled to the receiver circuit.

5. The method of claim 4, wherein the first predetermined fraction is substantially three percent.

6. The method of claim 4, wherein the second predetermined fraction is substantially ten percent.

7. A communication device comprising:

a first antenna having a first plane of polarization for receiving a transmitted signal;

a second antenna having a second plane of polarization for receiving a transmitted signal;

the first plane of polarization of the first antenna and the second plane of polarization of the second antenna having a known predetermined angular relationship;

a receiver circuit for demodulating the transmitted signal that is received by the first antenna or the second antenna and generating a demodulated signal;

an antenna switch coupled to the receiver circuit and to each of the first and second antennas, and being responsive to a switch control signal for coupling either the first antenna to the receiver circuit or the second antenna to the receiver circuit;

a signal strength measuring circuit coupled to the receiver circuit and measuring a signal strength of the demodulated signal and generating as output a short-term average signal power representing signal strength over a first predetermined number of symbol periods, a medium-term average signal power representing signal strength over a second predetermined number of symbol periods, and a long-term average signal power representing signal strength over a third predetermined number of symbol periods, the second predetermined number of symbol periods being greater than the first predetermined number of symbol periods which is greater than the first predetermined number of symbol periods, said signal strength measuring circuit periodically updating the short-term average signal power, the medium-term average signal power and the long-term average signal power; and a processor coupled to the signal strength measuring circuit and the antenna switch, and being programmed to generate the switch control signal to switch from one of the first antenna and the second antenna to an other of the first antenna and the second antenna when the short-term average signal power decreases to less than a first predetermined fraction of the long-term average signal power when said one of the first antenna and the second antenna is coupled to the receiver circuit, and to switch from said other of the first antenna and the second antenna to said one of the first antenna and the second antenna when the short-term average signal power is greater than the first predetermined fraction of the long-term average signal power and the medium-term average signal power is less than a second predetermined fraction of the long-term average signal power when said other of the first antenna and the second antenna is coupled to the receiver circuit.

8. The communication device of claim 7, wherein the processor further comprises a memory for storing an identification code of the communication device which is compared with an identification code in the transmitted signal to further decode messages encoded in the transmitted signal that are addressed to the communication device.

9. The communication device of claim 8, wherein the communication device is a selective call receiver.

* * * * *